United States Patent [19]

Ferdinand et al.

[11] 4,328,728
[45] May 11, 1982

[54] APPARATUS FOR EFFECTING A MITER CUT WITH A PORTABLE CIRCULAR SAW

[75] Inventors: Irwin J. Ferdinand, Glencoe; Richard Sylvan, Glenview; Herbert Baisch, Palatine, all of Ill.

[73] Assignee: Hirsh Company, Skokie, Ill.

[21] Appl. No.: 141,072

[22] Filed: Apr. 29, 1980

[51] Int. Cl.³ ............................ B27B 5/20; B27B 9/04
[52] U.S. Cl. ..................................... 83/471.3; 83/490; 83/473; 83/574; 83/765
[58] Field of Search ...................... 83/745, 471.3, 490, 83/412, 477.1, 765, 471.2, 574

[56] References Cited

U.S. PATENT DOCUMENTS

| | | | |
|---|---|---|---|
| 556,658 | 3/1896 | Barnes | 83/412 |
| 1,113,152 | 10/1914 | Clement | |
| 1,373,105 | 3/1921 | Simonsen | 83/765 |
| 2,306,512 | 12/1942 | Whitney | 83/574 |
| 2,680,458 | 6/1954 | Grammer | |
| 2,842,168 | 7/1958 | Truchan | |
| 3,454,055 | 7/1969 | Schnettler | 83/490 |
| 3,483,901 | 12/1969 | Ray | 83/471.3 |
| 3,570,564 | 3/1971 | Bergler | 83/471.3 |
| 3,731,572 | 5/1973 | Crooks | 83/471.3 |
| 3,842,700 | 10/1974 | Novak | 83/471.3 |
| 4,024,783 | 5/1977 | Sturgis | 83/468 |
| 4,079,648 | 3/1978 | Chappell | 83/490 |
| 4,109,901 | 8/1978 | Akin | 83/745 |
| 4,127,046 | 11/1978 | Jackson | 83/490 X |
| 4,245,533 | 1/1981 | Batson | 83/471.3 |

OTHER PUBLICATIONS

Brochure–The "Versatile One", Mitre Saw TGS 71, sold by Elu-Machinery Co., 9040 Dutton Drive, Twinsburg, OH, 44087.
Page H-14 of Export Market Magazine, Dec., 1979.
Page 68 of Sears Catalog.

*Primary Examiner*—Donald R. Schran
*Attorney, Agent, or Firm*—Dressler, Goldsmith, Shore, Sutker & Milnamow, Ltd.

[57] ABSTRACT

A saw support member for supporting a portable power circular saw is pivotably mounted to a platform defining a workpiece support surface. A pair of fences are pivotally connected on a fixed vertical axis to the platform. First and second arcuate guide slots are defined within the platform in arcs concentric about the fence pivot vertical axis. Each fence has spaced apart first and second guide members projecting therefrom into the first and second associated guide slots, respectively, for guiding the movement of the associated fence at spaced locations along its length. Means are provided for releasably restraining each fence from pivotable movement relative to the platform.

2 Claims, 8 Drawing Figures

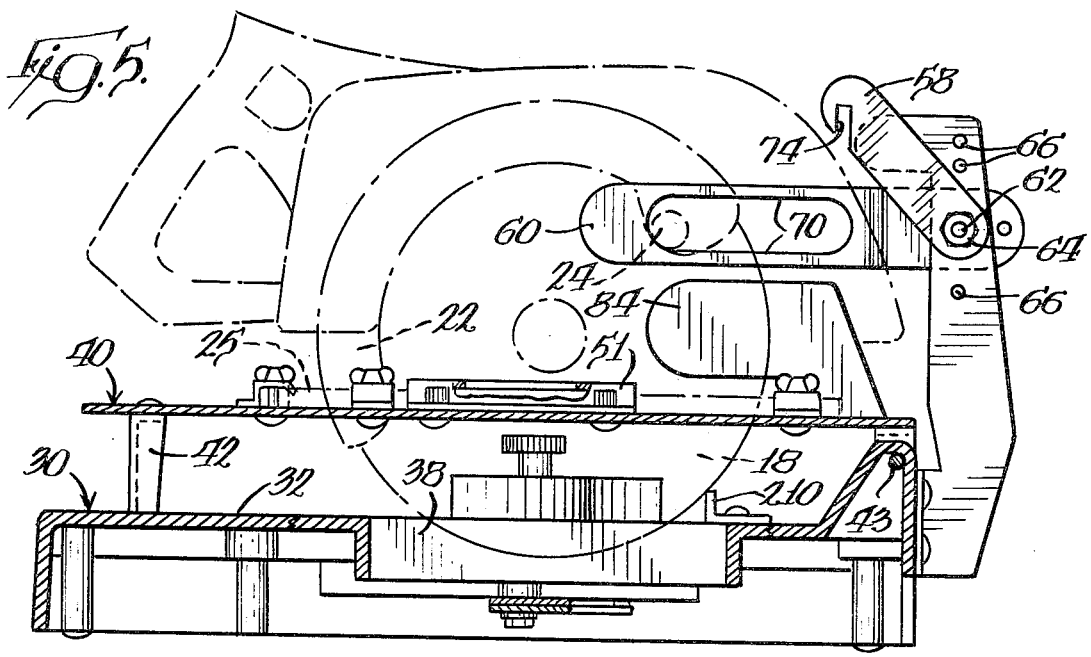
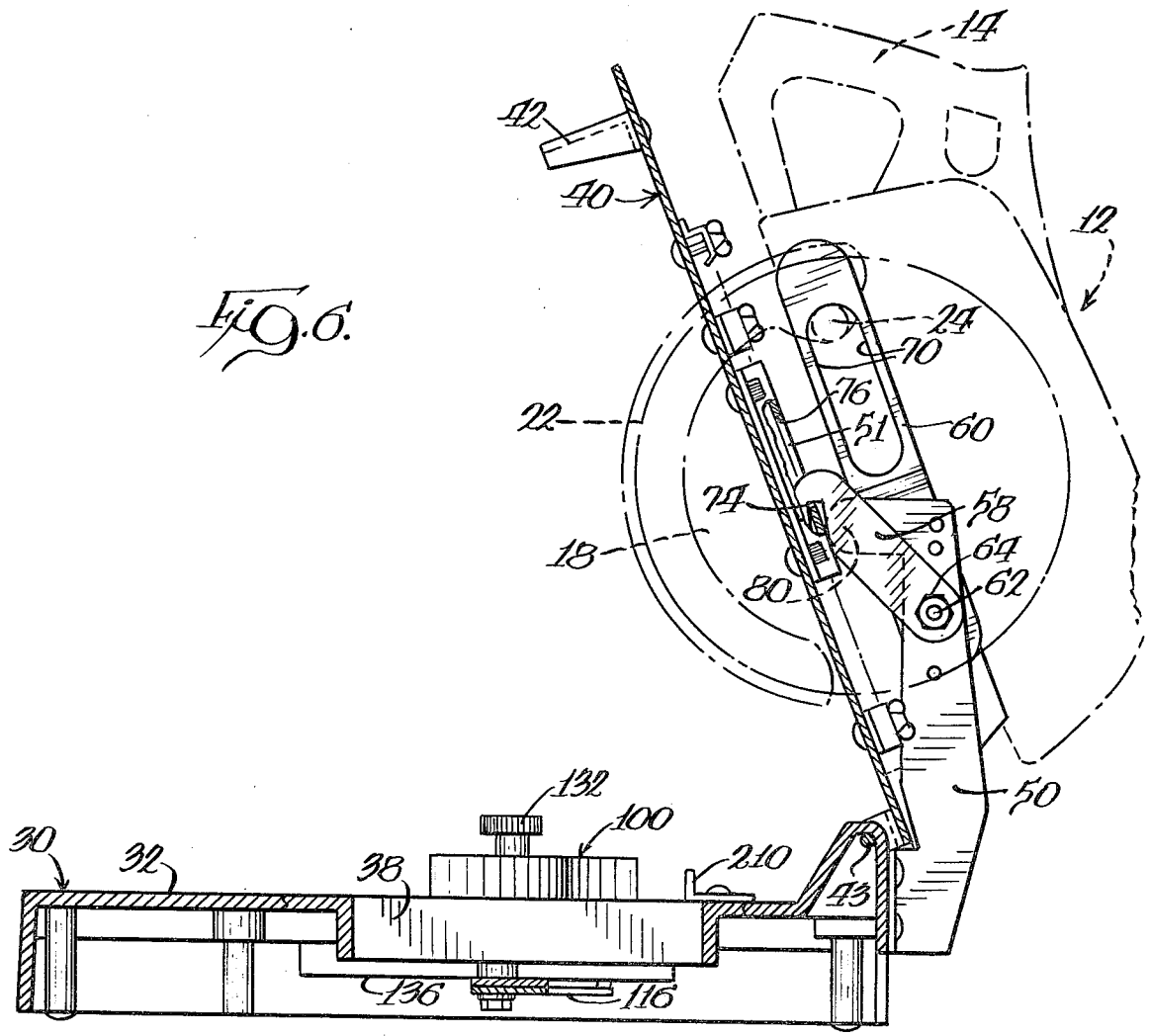

4,328,728

APPARATUS FOR EFFECTING A MITER CUT WITH A PORTABLE CIRCULAR SAW

DESCRIPTION

Technical Field

This invention relates to a platform device for mounting a portable electric circular saw and for supporting a workpiece at a desired angular position relative to the saw blade while making a miter cut.

BACKGROUND OF THE INVENTION

Although devices are available for supporting a portable power circular saw while making a miter cut in a workpiece, it would be desirable to provide a relatively inexpensive, compact, and yet sturdy platform and support assembly for the saw and workpiece. It would be advantageous to provide such an assembly with a means for holding the saw in a raised position to permit the workpiece to be disposed beneath the saw and further, to provide means for accommodating downward movement of the saw to plunge cut the workpiece. It would also be beneficial to provide readily adjustable workpiece fences for aligning the workpiece at a desired angle. It would be advantageous if the fences were sturdily supported and guided on the assembly to permit accurate alignment and registration of the workpiece at the desired angle. It would also be desirable to provide a means for automatically retracting the saw blade guard as the saw is lowered to cut the workpiece and for permitting the blade guard to extend around the saw blade as the saw is raised away from the workpiece.

SUMMARY OF THE INVENTION

In a preferred embodiment of the assembly of the present invention, a platform is provided defining a workpiece support surface for supporting a workpiece thereon. A plate-like saw support member for supporting a saw is pivotably mounted to the platform about a generally horizontal axis to permit movement of the saw support member to a fully lowered position generally spaced from and parallel to the platform and to a raised position tilted above the platform to allow placement, positioning, and removal of the workpiece. Clamps are provided for releasably securing the saw to the support member.

In the preferred embodiment, a pair of fences are pivotably connected on a single, fixed, vertical axis to the platform and are movable to various angular positions relative to the platform for aligning the workpiece while being cut.

Associated with each fence are first and second arcuate guide slots which are defined in the platform in arcs concentric about the fence pivot vertical axis. Also associated with each fence are first and second guide members which are spaced apart along each fence and project therefrom into the first and second guide slots, respectively, for guiding the movement of the associated fence at spaced locations along its length. An adjustable clamping means is provided on each fence for locking the fence against pivotable movement once it has been moved to the desired angle.

A hook is provided for holding the saw in a raised position to permit placement, removal, and positioning of the workpiece. The assembly also includes an abutment stop for preventing the saw from being raised upwardly beyond a certain position, a blade guard retainer for automatically retracting the blade guard from around the saw blade as the saw is lowered onto the workpiece, and a locator member for determining the lateral position of the saw relative to the saw support plate member.

Numerous other advantages and features of the present invention will become readily apparent from the following detailed description of the invention and of embodiments thereof, from the claims and from the drawings.

BRIEF DESCRIPTION OF THE DRAWINGS

In the accompanying drawings forming part of the specification and in which like numerals are employed to designate like parts throughout the same.

FIG. 5 is a cross-sectional view taken generally along the plane 5—5 in FIG. 3;

FIG. 6 is a view similar to FIG. 5 but showing the saw support member of the assembly held in the fully raised position;

DESCRIPTION OF THE PREFERRED EMBODIMENT

Figure 1:
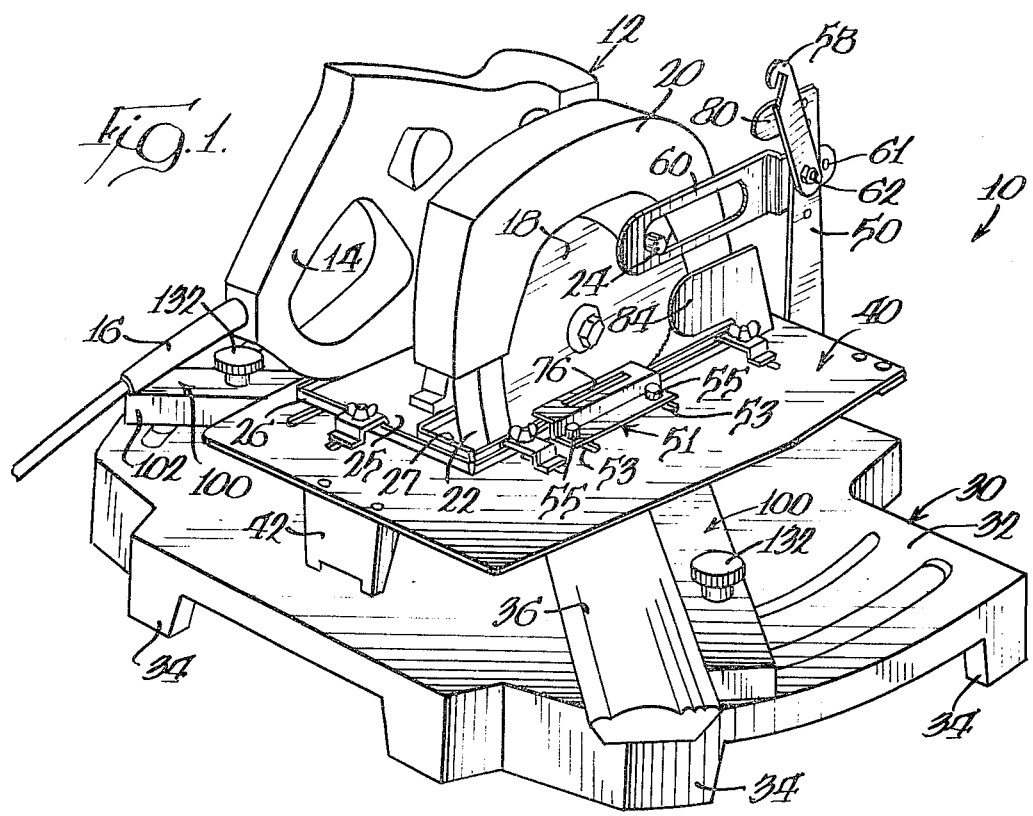
FIG. 1 is a perspective view of the assembly of the present invention showing a portable power circular saw mounted thereon in a fully lowered position and cutting a workpiece positioned on the assembly platform.

While this invention is susceptible of embodiment in many different forms, there are shown in the drawings and will herein be described in detail a preferred embodiment of the invention. It should be understood, however, that the present disclosure is to be considered as an exemplification of the principles of the invention and is not intended to limit the invention to the embodiment illustrated.

The precise shapes and sizes of the components herein described are not essential to the invention unless otherwise indicated.

For ease of description, the apparatus of this invention will be described in a normal operating position, in terms such as upper, lower, horizontal, etc. will be used with reference to its normal operating position. It will be understood, however, that the apparatus of this invention may be manufactured, stored, transported, used and sold in an orientation other than the normal operating position described.

FIG. 1 illustrates the miter platform and support assembly of the present invention wherein the assembly is designated generally by the numeral 10. The assembly is adapted to accommodate most types of conventional portable power circular saws that are currently commercially available in the United States of America. One such type of saw is designated generally by numeral 12 in FIG. 1. The saws typically have a handle 14, a power supply cord 16, a circular saw blade 18, a planar shoe or base plate 25, a fixed, upper saw blade guard 20, a spring-biased, movable, lower saw blade guard 22, and a lower saw blade guard operating lever 24.

As best illustrated in FIG. 1, the assembly 10 includes a platform 30 defining a workpiece support surface 32 on the top side thereof and having a plurality of legs or support feet 34 on the bottom side thereof. A workpiece 36 is shown in FIG. 1 as being positioned on the workpiece support surface 32 of the platform 30 below the saw 12.

Figure 2:
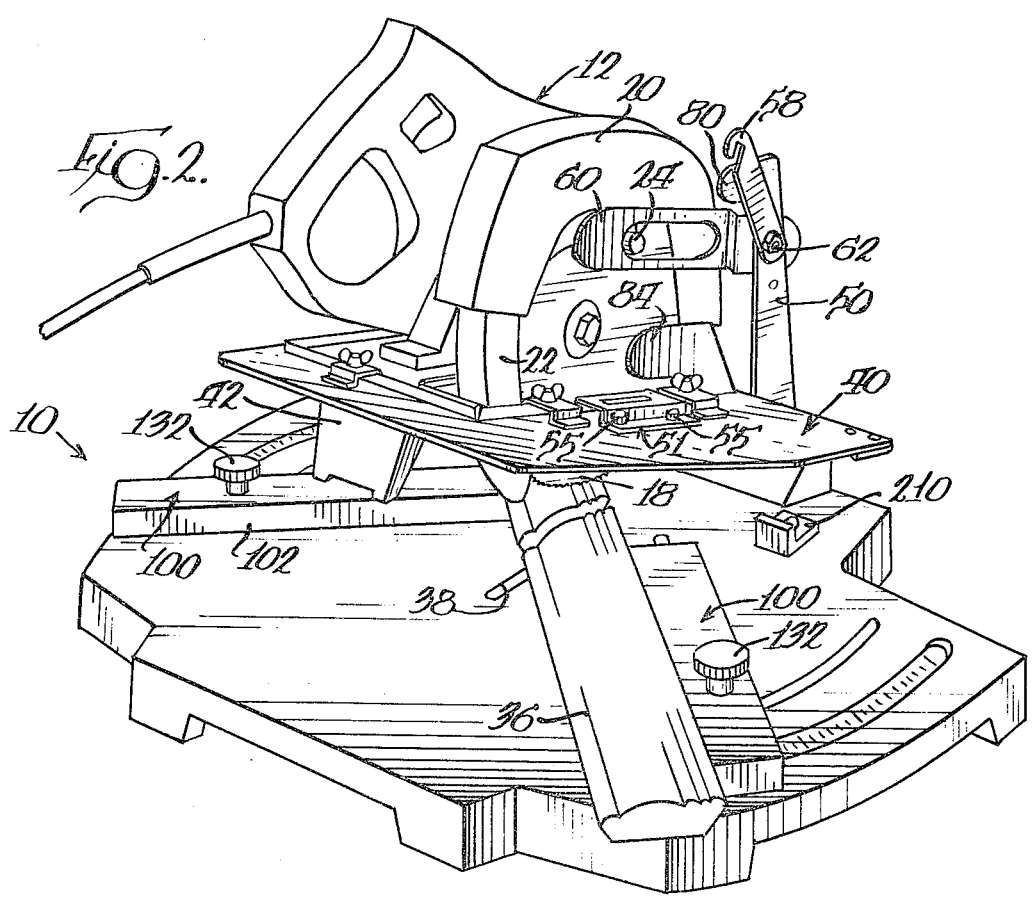
FIG. 2 is a view similar to FIG. 1 but showing the saw in a partially raised position after the workpiece has been cut.

The assembly 10 further includes a plate-like saw support member 40 to which the saw 12 is mounted, by means to be explained in detail hereinafter. The saw support member 40 is pivotally mounted by means to be described in detail hereinafter at the rear of the platform 30 about a generally horizontal axis to permit movement of the saw support member 40 between a fully lowered position generally spaced from and parallel to the platform (as illustrated in FIG. 1) and a raised position tilted above the platform (as illustrated in FIG. 2) to allow placement, positioning, and removal of the workpiece. As illustrated in FIG. 1, the saw support member 40 includes a leg 42 at the front for maintaining the saw support member 40 at the desired elevation above the work support surface 32 when the support member 40 is in the fully lowered position.

Figure 4:
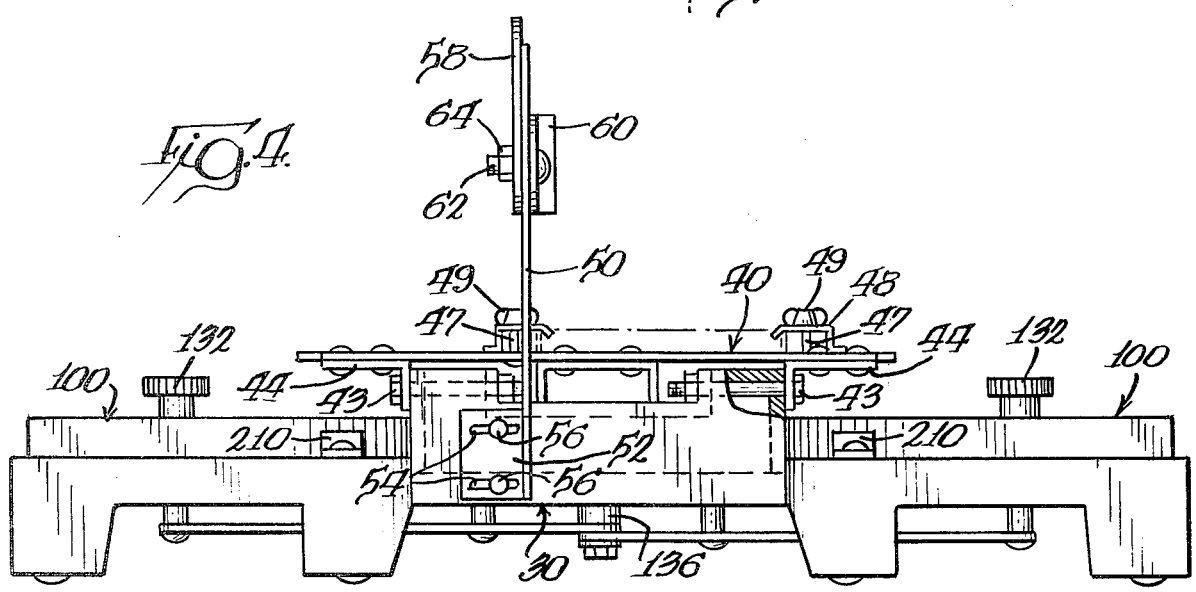
FIG. 4 is a view taken generally along the plane 4—4 in FIG. 3.

As best illustrated in FIGS. 4 and 5, the saw support plate 40 is pivotably mounted to the platform 30 about a generally horizontal axis defined by a pair of coaxial mounting screws 43. An L-shaped hinge plate 44 is secured at each side of the saw support member 40 to the underside of the member 40 and is mounted by means of the screw 43 to the support platform 30. To insure that the head of each screw 43 is properly seated as it is tightened, a bore is provided in the hinge plate 44 through which the screw 43 passes and the bore has a frustoconical countersunk portion. The screw 43 is provided with a mating, frustoconical-shaped head. Since the saw support plate 40 is pivoted on the two spaced-apart, coaxial screws 43, the saw support plate 40 is securely mounted and guided for movement in a plane perpendicular to the work support surface 32.

Both the saw support member 40 and the saw base plate 25 have openings or apertures defined therein for permitting positioning of the saw blade 18 and saw blade guard 22 therein. The saw base plate aperture is visible in FIG. 1 where it is designated by numeral 27 and is defined in the base plate 25 by an upstanding peripheral wall 26. The aperture in the saw support plate is visible in FIG. 3 where it is designated by numeral 29.

Figure 3:
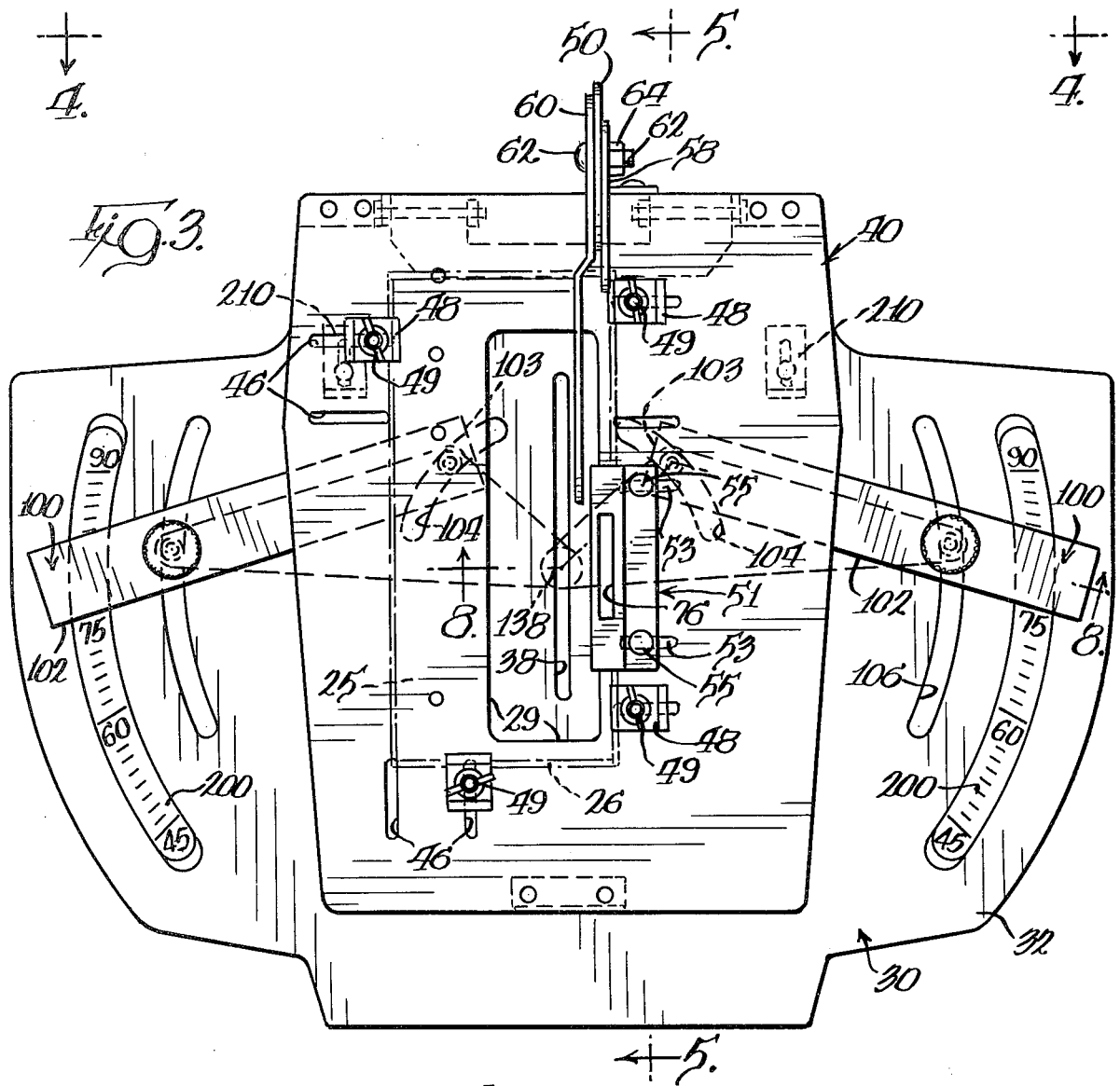
FIG. 3 is an enlarged, top view of the assembly illustrated in FIGS. 1 and 2 but with the saw and workpiece removed therefrom.

As best illustrated in FIG. 3, the saw support member or plate 40 is adapted to support and receive the saw 12 on its base plate 25. The base plate 25 is held by means of clamps 48 to the plate 40. To this end, the saw support plate 40 is provided with a plurality of slots 46 in which are received screws 47 (FIG. 4) for mounting the clamps 48 by means of wing nuts 49. Each clamp projects over the upstanding wall 26 of the saw base plate 25. In this manner, as best illustrated in FIG. 5, the saw base plate 25, and hence the saw fixed thereon, can be releasably secured to the saw plate 40 at a position in which the saw blade 18 is aligned with a saw blade receiving channel 38 defined in the platform 30.

The use of the clamps 48 in conjunction with the mounting slots 46 permit sufficient lateral adjustment of the clamps 48 to accommodate the various sizes of commercially available portable power circular saws.

When the saw is removed from the saw plate, the clamps 48 must be loosened and lifted out of contact with the base plate 25. When the saw is to be remounted again on the saw support plate 40, it would be desirable to be able to quickly position the saw in the same relative lateral position on the saw plate 40. To this end, as best illustrated in FIGS. 1 and 3, a bracket 51 is secured to the saw support plate 40. The bracket 51 is mounted by means of threaded fasteners 55 in a pair of slots 53 in the saw support plate 40. The saw is initially properly positioned on the saw support plate 40 so that the saw blade 18 is aligned with, and adapted to be received in, the saw blade receiving channel 38 in the platform 30. The bracket 51 is then secured in abutting engagement against the edge of the saw base plate 25.

For accommodating the movement of the saw blade completely through the workpiece when the workpiece is being cut, the platform saw blade receiving channel 38 has proportions slightly greater than the span of the portion of the blade 18 below the saw support surface 32 when the saw is in the fully lowered position.

As best illustrated in FIGS. 3-5, a vertically extending support bracket 50 is mounted to the rear of the platform 30 by means of a plate-like portion 52. The portion 52 has a pair of slots 54 for receiving a pair of bolts 56 which permit lateral adjustment of the support member 50.

As best illustrated in FIGS. 3 and 5, the support bracket 50 carries a hook 58 and a saw blade guard retainer 60. The hook 58 and saw blade guard retainer 60 are pivotally mounted to the vertical member 50 by means of screw 62 and bolt 64. To permit vertical adjustment of the hook 58 and saw blade guard retainer 60 a plurality of holes 66 is provided in the vertical bracket 50.

The saw blade guard retainer 60 has an elongate slot 70, as best illustrated in FIG. 5, in which can be received the saw blade guard operating lever 24. With most conventional, commercially available portable power circular saws, the blade guard 22 is spring biased relative to the saw blade to cover the bottom portion of the saw blade when the saw blade is not in contact with a workpiece. The guard may be pushed upwardly by the top portions of the workpiece as the workpiece is being cut to uncover a span of the saw blade. Additionally, the blade guard 22 may be moved upwardly to expose a portion of the saw blade by pushing on lever 24 (in the clockwise direction as viewed in FIG. 5).

As illustrated in FIG. 5, it is desirable to hold the blade guard 22 up and away from the work support surface 32, and any workpiece thereon, when the saw is in the fully lowered position illustrated in dashed lines in FIG. 5. To this end, the saw blade guard retainer 60 engages the saw blade guard operating lever 24 at the forward end of the slot 70 to prevent the guard 22 from being urged downwardly by the blade guard bias spring (not illustrated, but part of the conventional blade guard mechanism provided with the saw). Conversely, when the saw is in a raised position, as illustrated in FIG. 6, the blade guard 22 is permitted to swing downwardly around the bottom portion of the saw blade. This is because the saw support plate 40 is pivoted about the horizontal axis defined by screws 43 and this axis is lower than the horizontally disposed pivot axis screw 62 of the saw blade guard retainer 60. Thus, when the saw support plate 40 is tilted upwardly, the saw blade guard retainer 60 and the saw 12 move relative to each other so that the retainer slot 70 is effectively closer to the saw handle 14 and thus permits outward movement of the saw blade guard lever 24 within the slot 70 under the action of the saw blade guard bias spring. This permits the guard 22 to move in the counterclockwise direction around the bottom portion of the blade as viewed in FIG. 6.

As best illustrated in FIG. 1, the saw blade guard retainer 60 has a plurality of holes 61 (only one of which holes is visible in FIG. 1) and any one of the holes 61 is adapted to accommodate the pivotable mounting of the retainer 60 on the vertical bracket 50 by means of the screw 62. This permits the retainer 60 to be properly adjusted for most types of commercially available portable power circular saws marketed in the United States of America.

The saw 12 may be retained in the fully raised positions illustrated in FIG. 6 by means of the hook 58. To this end, hook 58 may be received within a slot 76 defined within the bracket 51 on the saw support plate 40. The hook 58 has a slot 74 at its distal end which is engaged with a portion of the bracket 51 defining the slot 76.

The assembly is provided with a mechanism limiting the height to which the saw 12 can be raised. To this end, the vertical bracket 50 mounted to the rear of the platform 30 has an outwardly extending projection 80 as best illustrated in FIGS. 1, 3 and 6. The distal end of the projection 80 abuts against a portion of the bracket 51 and prevents the saw support member 40 from being tilted beyond the angle illustrated in FIG. 6.

An additional saw blade guard 84 (FIG. 1) is secured to the saw support plate 40 adjacent the rear edge of the saw support plate 40 and projects forwardly alongside the saw blade 18. Unlike the movable saw blade guard 22 provided with, and as a part of, the portable power saw, the saw blade guard 84 is stationary and fixed to the saw support blade 40.

Figure 7:
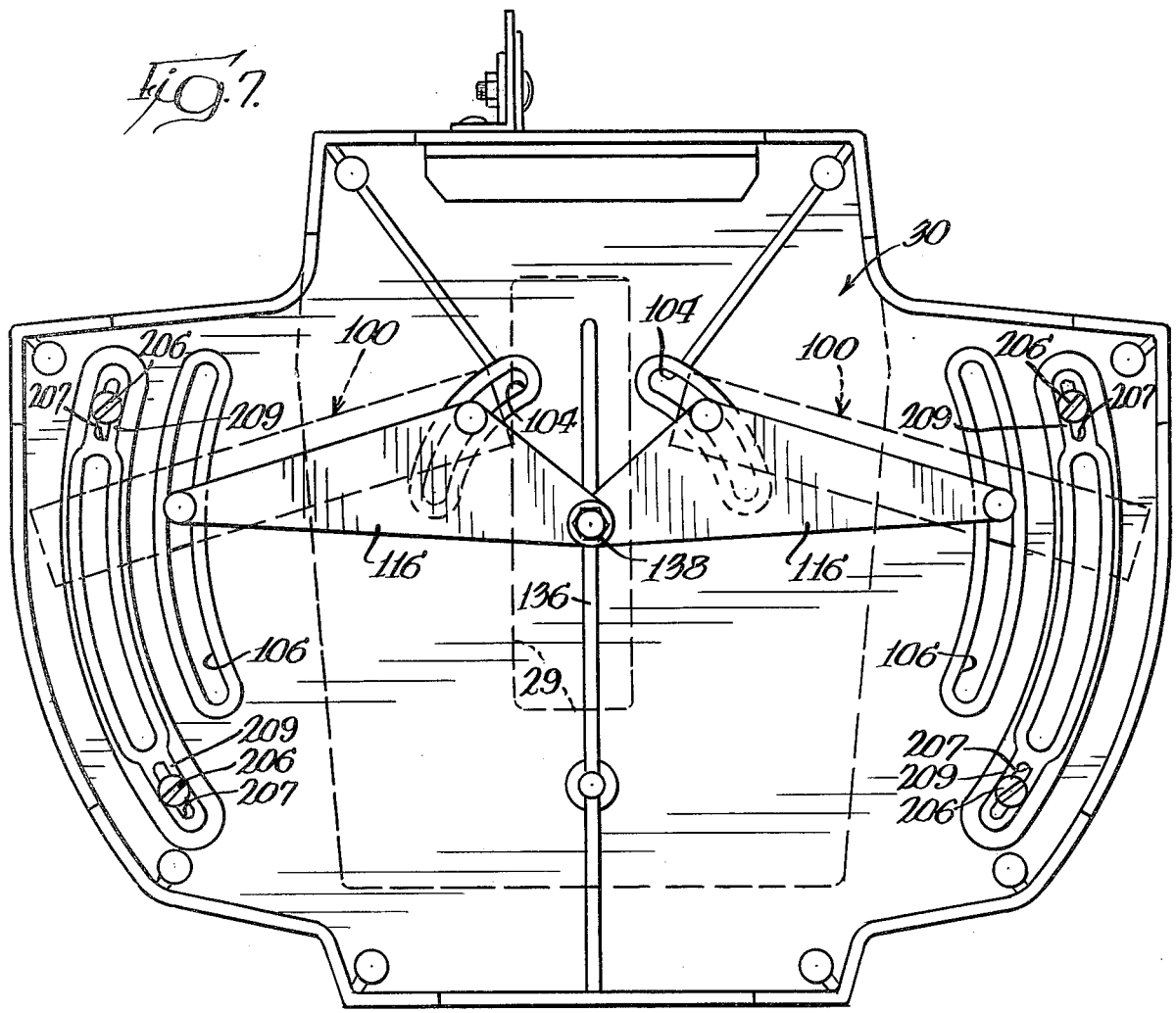
FIG. 7 is a bottom view of the assembly illustrated in FIG. 3.

A novel means is provided for aligning the workpiece at the desired angle for the miter cut. A pair of fences 100 is provided on the platform 30 as best illustrated in FIGS. 3 and 7. Each fence 100 is a hollow structure having walls defining a generally right rectangular prism with one of the prism faces functioning as a workpiece alignment surface 102.

Figure 8:
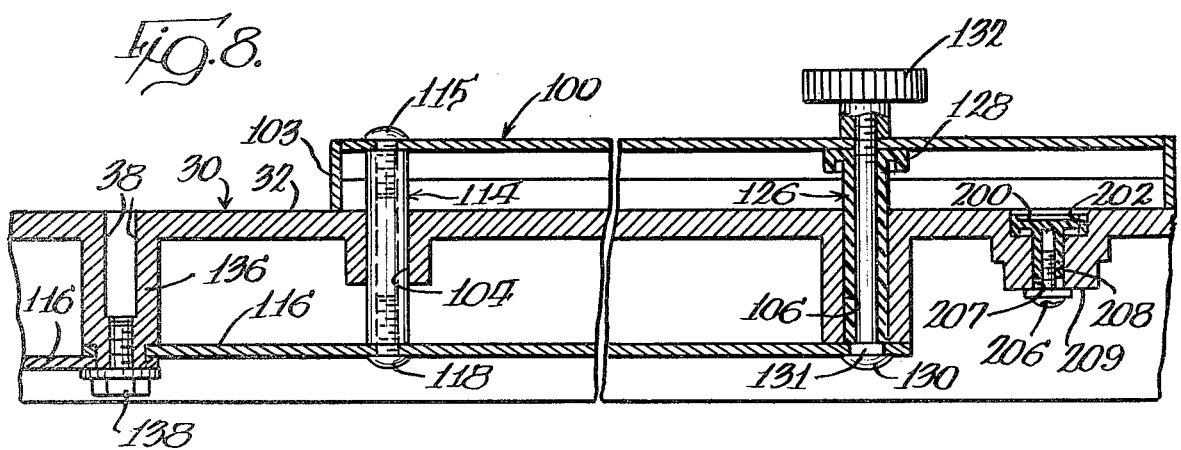
FIG. 8 is an enlarged, fragmentary, cross-sectional view taken generally along the multiple planes 8—8 in FIG. 3.

Associated with each fence 102 on the work support surface 32 of the platform 30, are first and second arcuate guide slots 104 and 106, respectively. As best illustrated in FIG. 8, each guide slot 104 and 106 extends from the workpiece support surface 32 and through the platform 30.

Disposed within the first guide slot 104 is a first guide member 114 which is secured to the fence 100 by means of a screw 115. The guide member 114 is a hollow cylinder threaded at its upper end for receiving the screw 115. Below the platform 30 the guide member 114 is secured to a generally planar mounting member 116 by means of screw 118. The bottom portion of the interior of the cylindrical shaped hollow guide member 114 is threaded for being engaged by the screw 118 which holds the mounting member 116 to the guide member 114. The mounting member 116 for each fence 100 is pivotably mounted to a downwardly projecting rib 136 of the platform 30 by means of a screw 138.

Spaced from the first guide member 114 along the fence 100 is a second guide member 126 which is received within the second guide slot 106. The second guide member 126 is a hollow, cylindrical member similar to guide member 114 but having an upper flange 128 engaging the underside of the top wall portion of the hollow fence 100.

A stove bolt 130 is disposed within the hollow cylindrical guide member 126 and is threadingly engaged with a fence clamp knob 132 on the top of the fence 100. A square neck portion 131 of the stove bolt 130 engages the distal end of the fence mounting member 116 and prevents the bolt 130 from rotating. Rotation of the knob 132 in one direction will clamp the fence 100 at a desired angular position while rotation of the knob in the other direction will permit angular adjustment of the fence.

The above-described novel fence mounting structure provides a unique means for guiding the fence as it is adjusted relative to the platform 30 and provides a more rigid fence structure.

The mounting member 116 has a generally triangular configuration as best illustrated in the bottom view of FIG. 7. The first and second guide members 114 and 126, respectively, and the fence pivot vertical axis defined by the screw 138 each define a vertex of a triangle. The first guide member 114 of each fence 100 is nearer the fence pivot vertical axis than is the second guide member 126 of that fence. As illustrated in the plan view of FIG. 3, the pivot axis of the fences is thus seen to be displaced forwardly of the workpiece alignment surface 102.

The angular position of the fences 100 can be determined by means of an arcuate scale member 200 which is associated with each fence on either side of the platform 30. Each arcuate scale member 200 has a graduated angle indicator face marked in degrees. The indicator illustrated in FIG. 3 is marked from 45 degrees to 90 degrees.

The arcuate scale member 200 is received in an arcuate receiving channel 202 defined in the platform 30 as best illustrated in FIG. 8. Also, as best illustrated in FIG. 3, the length of the arc of the scale member 200 is less than the length of the arc of the receiving channel 202 to permit the scale member 200 to be moved rearwardly or forwardly in the receiving channel 202 for purposes of initially calibrating the assembly.

To this end, as best illustrated in FIG. 8, two mounting screws 206 are provided underneath the platform 30 and are each adapted to threadingly engage a downwardly projecting, hollow, threaded, cylindrical projection 208 of member 200. A ribbed portion of the bottom of platform 30 is provided with a slot 207 for receiving each screw 206 as best illustrated in FIGS. 7 and 8. The underside of the head of each screw 206 is adapted to bear against a surface 209 of the ribbed portion of the platform.

When the screw 206 is loosened, the scale member 200 can be slid forwardly or rearwardly. When the screw 206 is tightened, the scale member 200 is drawn tight against the bottom of the channel 202 and restrained against further movement.

For initially calibrating the assembly, a pair of "180 degree" stops 210 are provided on either side of the top of the platform 30 as best illustrated in FIGS. 2, 4, 5 and 6. The stops 210 are fixed to the top of the platform 30 at the precise location, relative to the fence pivot screw 138, so that the fences 100 form a straight line, when the fence mounting members 116 are moved against the stops 210. With the fences in the straight line position, the arcuate scale members 200 are adjusted within the receiving slots 202 so that the 90 degree indicia on each scale member is in alignment with the vertical workpiece alignment surface 102 on the fence 100. In this position the scale members 200 are then tightened by means of the adjusting screws 206 (FIG. 7).

It should be noted that with the novel pivoting fence structure of the present invention, when the the fences are adjusted so that they lie in a straight line (at the "90 degree" angle on the scale members), the fence inner ends 103 (FIGS. 3 and 8) adjacent the saw blade 18 are relatively close to each other to provide good support and alignment of a workpiece disposed thereagainst.

The relative closeness of the fence inner ends 103 adjacent the saw blade in the "straight line" position provides a greater total alignment bearing surface for a workpiece. The fact that the two inner ends 103 of the fences 100 are relatively close together in the "straight line" position permits a relatively small workpiece to be properly guided along its length on either side of the saw blade. Further, the closeness of the inner ends of the fences in the "straight line" position permits a relatively small segment of a workpiece to be cut while maintaining sufficient engagment of both portions of the workpiece with the fences on either side of the saw blade.

The fact that the pivot axis screw 138 is mounted forward of the straight line formed by the two fences in the "90 degree" position provides a novel advantage. When the fences 100 are swung forward to an angular position less than 90 degrees, the fence inner ends 103 adjacent the saw blade 18 move outwardly away from each other and from the saw blade along the path generally defined by the associated first arcuate guide slot 104. This provides increased clearance for an end portion of a workpiece to pass beneath the saw blade between the two fence inner ends 103. This permits larger workpieces to be accommodated.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims, all such modifications as fall within the scope of the claims.

What is claimed is:

1. A miter platform and support assembly for a portable power circular saw that may be temporarily secured in a fixed position allowing the user to plunge cut a workpiece with a downward movement of said saw, said assembly comprising:

a platform defining a workpiece support surface for supporting a workpiece thereon;

a saw support member for supporting said saw thereon;

means for releasably securing said saw to said saw support member;

means for pivotably mounting said saw support member to said platform about a substantially horizontal axis to permit movement of said saw support member between a fully lowered position generally spaced from and parallel to said platform and a raised position tilted above said platform to allow placement, positioning, and removal of the workpiece;

two independently movable fences pivotally connected at a substantially vertical pivot axis to said platform and movable to various angular positions across and relative to said platform for aligning the workpiece;

first and second arcuate guide slots associated with each said fence and defined in said platform in arcs concentric about said fence vertical pivot axis;

first and second guide members spaced apart along each said fence and projecting therefrom into said first and second arcuate guide slots, respectively, for guiding the movement of the associated fence at spaced locations along its length;

means for releasably restraining each said fence from pivotable movement relative to said platform;

a vertically extending support bracket mounted to said platform, said bracket defining a plurality of vertically spaced holes above the elevation of said workpiece support surface; and an arm defining a saw blade guard operating lever engaging slot for receiving an operating lever of the blade guard on a saw; and means for pivotally mounting said arm to said bracket through one of said vertically spaced holes about an axis fixed relative to said platform.

2. A miter platform and support assembly for a portable power circular saw that may be temporarily secured in a fixed position allowing the user to plunge cut a workpiece with a downward movement of said saw, said assembly comprising:

a platform defining a workpiece support surface for supporting a workpiece thereon;

a saw support member for supporting said saw thereon;

means for releasably securing said saw to said saw support member;

means for pivotally mounting said saw support member to said platform about a substantially horizontal axis to permit movement of said saw support member between a fully lowered position generally spaced from and parallel to said platform and a raised position tilted above said platform to allow placement, positioning, and removal of the workpiece;

two independently movable fences pivotally connected at a substantially vertical pivot axis to said platform and movable to various angular positions across and relative to said platform for aligning the workpiece;

first and second arcuate guide slots associated with each said fence and defined in said platform in arcs concentric about said fence vertical pivot axis;

first and second guide members spaced apart along each said fence and projecting therefrom into said first and second arcuate guide slots, respectively, for guiding the movement of the associated fence at spaced locations along its length;

means for releasably restraining each said fence from pivotal movement relative to said platform;

a vertically extending support bracket mounted to said platform, said bracket defining a plurality of vertically spaced holes above the elevation of said workpiece support surface;

a horizontal bracket mounted to said saw support member and having a portion spaced away from said saw support member, said portion defining a hook-receiving slot;

a hook means for entering said hook-receiving slot in said horizontal bracket and for engaging a portion of said saw support member adjacent said hook-receiving slot when said saw support member is in said raised position; and means for pivotally mounting said hook means to said vertically extending bracket through one of said vertically spaced holes.

* * * * *